(12) United States Patent
Schleif (10) Patent No.: US 7,346,996 B2
(45) Date of Patent: Mar. 25, 2008

(54) APPARATUS AND A METHOD FOR ASSESSING AN ANCHORAGE POSITION

(75) Inventor: Kurt Schleif, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 10/907,573

(22) Filed: Apr. 6, 2005

(65) Prior Publication Data

US 2006/0226692 A1    Oct. 12, 2006

(51) Int. Cl.
*G01B 3/00*    (2006.01)
(52) U.S. Cl. .......................... 33/501; 33/833
(58) Field of Classification Search ............... 33/451, 33/452, 454, 460, 464, 472, 473, 501, 511, 33/512, 513, 514, 515, 522, 545, 556, 572, 33/700, 701, 712, 832, 833
See application file for complete search history.

(56) References Cited

U.S. PATENT DOCUMENTS

| | | | | |
|---|---|---|---|---|
| 1,524,392 | A * | 1/1925 | East ............................ | 33/460 |
| 2,301,841 | A * | 11/1942 | Zeder .......................... | 73/161 |
| 3,592,041 | A * | 7/1971 | Spencer ........................ | 73/7 |
| 4,708,148 | A * | 11/1987 | Olson .......................... | 600/594 |
| 4,802,494 | A * | 2/1989 | Gardiner ...................... | 600/592 |
| 5,363,027 | A * | 11/1994 | Noguchi ....................... | 318/573 |
| 5,372,035 | A * | 12/1994 | Ogawa et al. ................. | 73/117 |
| 5,373,749 | A * | 12/1994 | Strand et al. ................ | 73/865.3 |
| 5,415,034 | A * | 5/1995 | Nishikawa et al. ........... | 73/117 |
| 5,459,676 | A * | 10/1995 | Livingston ................... | 700/296 |
| 5,564,195 | A * | 10/1996 | Kokot et al. .................. | 33/545 |
| 5,641,917 | A * | 6/1997 | Hurite et al. ................. | 73/865.3 |
| 5,821,415 | A * | 10/1998 | Faust et al. ................... | 73/172 |
| 5,831,172 | A * | 11/1998 | Kidd ............................ | 73/828 |
| 6,112,608 | A * | 9/2000 | Spravsow et al. ............. | 74/335 |
| 6,131,436 | A * | 10/2000 | O'Bannon et al. ............. | 73/7 |
| 6,386,054 | B1 * | 5/2002 | Jones et al. .................. | 73/865.3 |
| 6,510,616 | B1 * | 1/2003 | Sparkman ..................... | 33/460 |
| 6,772,078 | B2 * | 8/2004 | Uehira ......................... | 702/85 |
| 7,021,709 | B2 * | 4/2006 | Dolan et al. .................. | 297/253 |
| 7,126,462 | B2 * | 10/2006 | Schleif et al. ............... | 340/438 |
| 2002/0014017 | A1* | 2/2002 | Egan ........................... | 33/512 |

FOREIGN PATENT DOCUMENTS

JP    04095841 A *  3/1992
JP    04095842 A *  3/1992

* cited by examiner

*Primary Examiner*—R. Alexander Smith
(74) *Attorney, Agent, or Firm*—Frank A. MacKenzie; Brooks Kushman P.C.

(57) ABSTRACT

An apparatus for assessing a position of an anchorage of a child restraint anchorage system. The apparatus includes a base, a first slide assembly, and a second slide assembly. The first slide assembly is movably disposed on the base for engaging a seat back. The second slide assembly is movably disposed on the base and includes a measurement tool for measuring the position of an anchorage.

20 Claims, 5 Drawing Sheets

APPARATUS AND A METHOD FOR ASSESSING AN ANCHORAGE POSITION

BACKGROUND OF THE INVENTION

1. Field of the Invention

The present invention relates to an apparatus and a method for assessing the position of an anchorage of a child restraint anchorage system of a motor vehicle.

2. Background Art

Motor vehicles may include a child restraint anchorage system. A child restraint anchorage system uses a plurality of anchorages to transfer loads from a child safety seat to the vehicle structure. These anchorages must be properly located to receive a child safety seat.

Before applicant's invention, there was a need for an apparatus and a method for accurately assessing the position of an anchorage of a child restraint anchorage system. In addition, there was a need for an apparatus and a method that could be used with various child restraint anchorage designs and configurations. Moreover, there was the need for an apparatus that could accommodate different seat designs. Also, there was the need for an easy-to-use apparatus and method to reduce training time and associated costs. Problems associated with the prior art as noted above and other problems are addressed by applicant's invention as summarized below.

SUMMARY OF THE INVENTION

According to one aspect of the present invention, an apparatus for assessing a position of an upper anchorage of a child restraint anchorage system disposed proximate a vehicle seat is provided. The vehicle seat includes a seat bottom and a seat back. The apparatus includes a base and first and second slide assemblies. The base is adapted to be positioned on the seat bottom. The first and second slide assemblies are movably disposed on the base. The first slide assembly is adapted to engage the seat back. The second slide assembly includes a measurement tool for measuring the position of the upper anchorage. The apparatus facilitates accurate anchorage position assessments while accommodating various seat and anchorage configurations.

The base may include an engagement arm having a slot adapted to receive a lower anchorage of the child restraint anchorage system. The engagement arm may include a latch pin disposed at least partially within the engagement arm and adapted to secure the engagement arm to the lower anchorage.

The first slide assembly may be adapted to move between a retracted position in which the first slide assembly is spaced apart from the seat back and an advanced position in which the first slide assembly contacts the seat back.

The first slide assembly may include a frame having a guide for receiving a tether that engages the upper anchorage. The first slide assembly may include first and second cross members moveably disposed on the base. The frame may be disposed proximate the first cross member. A brace may be attached to the frame at a first end and attached to the second cross member at a second end.

The second slide assembly may include a positioning mechanism. The positioning mechanism may be adapted to move along a first axis disposed parallel to the base and along a second axis disposed perpendicular to the base. The positioning mechanism may be adapted to pivot about an axis of rotation disposed perpendicular to the first and second axes.

The second slide assembly may include a support that is attached to the positioning mechanism. An arm may be movably disposed on the support that is configured to receive the measurement tool.

According to another aspect of the present invention, an apparatus for assessing a position of an anchorage of a child restraint anchorage system is provided. The child restraint anchorage system includes upper and lower anchorages. The apparatus includes a base and first and second slide assemblies. The base is adapted to engage the lower anchorage. The first and second slide assemblies are movably disposed on the base. The second slide assembly includes a measurement tool for measuring the position of the upper anchorage.

The first slide assembly may be disposed between a seat back and the second slide assembly. The first slide assembly may include a guide configured to receive a tether configured to position the upper anchorage.

The apparatus may include a first inclinometer for measuring an angle of inclination of the base. The apparatus may include a second inclinometer for measuring an angle of inclination of at least a portion of the second slide assembly.

The base may include an engagement arm having a slot adapted to receive the lower anchorage and a latch pin having a hook portion configured to secure the lower anchorage to the engagement arm.

The second slide assembly may include a positioning mechanism having a first portion, a second portion, and a pivot portion. The first portion may be movably disposed on the base. The second portion may be movably disposed on the first portion. The pivot portion may be attached to the second portion and may be adapted to rotate about an axis of rotation.

The second slide assembly may include a support attached to the pivot portion. The measurement tool may be connected to the support.

According to another aspect of the present invention, a method for assessing a position of an anchorage of a child restraint anchorage system is provided. The child restraint anchorage system is associated with a vehicle seat having a seat back and a seat bottom. The assessment apparatus includes a base, a first slide assembly, and a second slide assembly having a measurement tool.

The method includes the steps of positioning the base on the vehicle seat such that the base contacts the seat bottom, actuating the first slide assembly to contact the seat back, positioning the second slide assembly relative to the base, and measuring a distance between the slide assembly and the anchorage with the measurement tool.

DETAILED DESCRIPTION OF THE EMBODIMENT(S)

Figure 1:
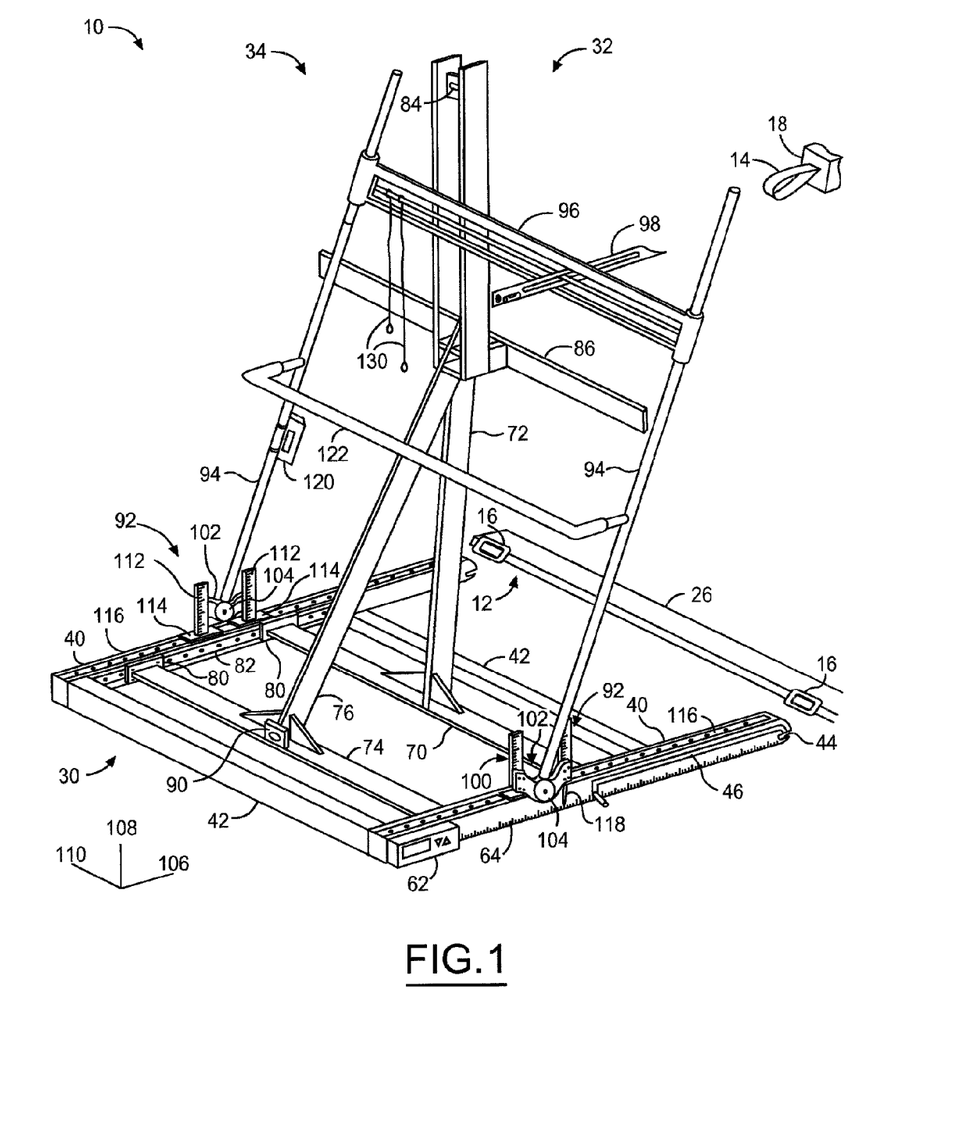
FIG. 1 is a perspective view of an apparatus for assessing a position of an anchorage of a child restraint anchorage system.

Referring to FIG. 1, an anchorage position assessment apparatus 10 is shown. The apparatus 10 is adapted to assess the position of an anchorage, such as an upper anchorage of a child restraint anchorage system 12.

The child restraint anchorage system 12 includes one or more anchorages adapted to receive a component of a child restraint system, such as a mating feature of a child safety seat or a tether strap. The anchorages are adapted to transmit force from the child restraint system to the vehicle. In FIG. 1, one exemplary embodiment of a child restraint anchorage system is shown. In this embodiment, the child restraint anchorage system 12 includes an upper anchorage 14 and two lower anchorages 16.

The upper anchorage 14 may be adapted to secure an upper portion of a child restraint system. The upper anchorage 14 may have any suitable configuration. In the embodiment shown, the upper anchorage 14 is configured as a loop and is mounted on another vehicle component, such as a structural component of the vehicle or seat. For convenience in reference, the attachment point for an anchorage, such as the upper anchorage 14, is referred to as an anchorage mount 18.

The lower anchorage 16, if employed, is adapted to secure a lower portion of a child restraint system. In the embodiment shown, the lower anchorages 16 are disposed proximate a vehicle seat 20, such as near a seat bottom 22 and/or a seat back 24. In addition, the lower anchorages 16 may be coupled to a bracket 26 that is attached to a portion of the motor vehicle. Alternatively, the bracket 26 may be omitted and the lower anchorages 16 may be attached to another vehicle component, such as a seat frame or structural member of the vehicle. In some embodiments, the lower anchorages may be omitted, although the upper anchorage 14 may be present.

Referring again to FIG. 1, the apparatus 10 includes a base 30, a first slide assembly 32, and a second slide assembly 34. The first and second slide assemblies 32,34 may be configured to move over a range of distances to accommodate different vehicles, seat designs, and anchorage system configurations.

The base 30 may have any suitable configuration and may be made of any suitable material, such as a metal or polymeric material. The base 30 may include one or more engagement arms 40 and one or more connecting members 42. In the embodiment shown, the base 30 includes two engagement arms 40 that are spaced apart from each other. Each engagement arm 40 may be adapted to engage a lower anchorage 16 of a child restraint anchorage system 12, if so equipped. Each engagement arm 40 may have the same or different configuration. In the embodiment shown, the engagement arms 40 are configured as a mirror images of each other.

Figure 2A:
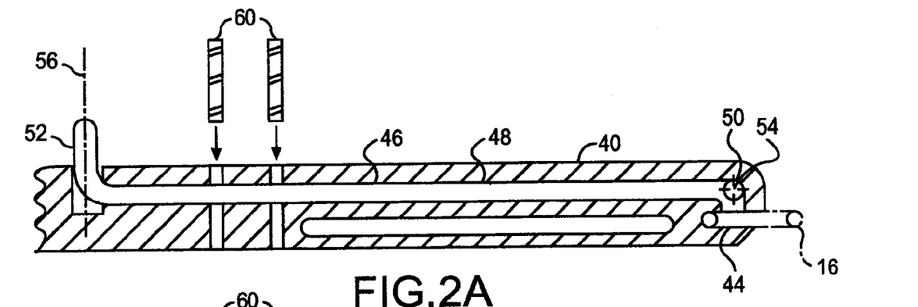
FIG. 2A is a section view of an engagement arm of the apparatus having a latch pin in an unlatched position.
Figure 2B:
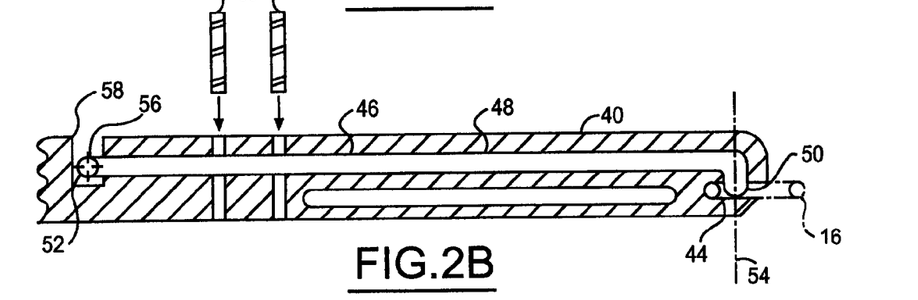
FIG. 2B is a section view of the engagement arm with the latch pin in a latched position.

Referring to FIGS. 2A and 2B, one embodiment of an engagement arm 40 is shown in more detail. In this embodiment, the engagement arm 40 includes a slot 44, a latch pin groove 46, and a latch pin 48.

The slot 44 may be adapted to receive a lower anchorage 16. The slot 44 may have any suitable configuration. In the embodiment shown, the slot 44 has a linear configuration and is disposed proximate an end of the engagement arm 40. Alternatively, the slot 44 may have a non-linear configuration.

The latch pin groove 46 is adapted to receive the latch pin 48. In the embodiment shown, the latch pin groove 46 extends along the engagement arm 40 and includes an end disposed proximate the slot 44.

The latch pin 48 may be adapted to rotate in the latch pin groove 46. The latch pin 48 may have any suitable configuration. In the embodiment shown, the latch pin 48 includes a first hook portion 50 and an optional second hook portion 52.

The first hook portion 50 is disposed along a first axis 54 at any suitable angle relative to the latch pin groove 46. The first hook portion 50 is adapted to rotate toward the slot 44 to engage a lower anchorage 16 as will be described in more detail below.

The second hook portion 52 may extend from the engagement arm 40 to function as a handle that facilitates rotation of the latch pin 48. The second hook portion 52 may have the same orientation or a different orientation than the first hook portion 50. In the embodiment shown, the second hook portion 52 is disposed along a second axis 56 disposed perpendicular to the first axis 54. Alternatively, the first and second axes 54,56 may be disposed at any suitable angle relative to each other.

The latch pin 48 may be adapted to move between an unlatched position as shown in FIG. 2A and a latched position as shown in FIG. 2B. The first hook portion 50 is disposed outside the slot 44 when in the unlatched position and is disposed at least partially in the slot 44 in the latched position. The first hook portion 50 is adapted to secure the lower anchorage 16 in the slot 44 between the first hook portion 50 and the engagement arm 40 to inhibit movement of the apparatus 10.

A latch slot 58 may be disposed proximate the latch pin groove 46. In one embodiment, the latch slot 58 is adapted to receive the second hook portion 52 to help secure the latch pin 48 in the latched position.

The engagement arm 40 may include one or more retaining pins 60 adapted to hold the latch pin 48 in the latch pin groove 46 yet permit the latch pin 48 to rotate.

Referring again to FIG. 1, one or more connecting members 42 may be employed. The connecting member(s) 42 may have any suitable configuration and may be used to couple at least two engagement arms 40. In the embodiment shown in FIG. 1, the connecting members 42 are attached to and extend between opposing engagement arms 40. Alternatively, the connecting member 42 may be panel that extends between the engagement arms 40. The connecting member 42 may be made of any suitable material and may be attached in any suitable manner, such as with an adhesive, fasteners, or by welding.

The base 30 may also include one or more measurement tools or measuring devices adapted to indicate the position or orientation of the apparatus 10 or a portion of the apparatus. In the embodiment shown, the measuring devices include an inclinometer 62 and a scale 64.

The inclinometer 62 is adapted to indicate an orientation of the base 30 relative to a horizontal plane. The inclinometer 62 may be disposed in any suitable location, such as on the base 30. In the embodiment shown, the inclinometer 62 is disposed proximate an engagement arm 40 near an end opposite the slot 44.

The scale 64 may be provided to measure the position or displacement of a portion of the apparatus, such as the first and/or second slide assemblies 32,34. The scale 64 may be attached to or integrated with the base 30. In the embodiment shown, the scale 64 is disposed along a side of the engagement arm 40.

The first slide assembly 32 is configured to be movably positioned relative to the base 30. More specifically, the first slide assembly 32 is adapted to move between a retracted position in which the first slide assembly 32 is spaced apart from the seat 20 and an advanced position in which the first slide assembly 32 contacts the seat 20. The first slide assembly 32 may have any suitable configuration. In the embodiment shown in FIG. 1, the first slide assembly 32 includes a first cross member 70 and a frame 72 disposed proximate the first cross member 70. Optionally, the first slide assembly 32 may include a second cross member 74 and a brace 76.

The first cross member 70 may be movably disposed on the base 30 in any suitable manner. In the embodiment shown in FIG. 1, each end of the first cross member 70 is attached to a mounting block 80. Each mounting block 80 is moveably disposed on a guide rail 82. Each guide rail 82 may be disposed on any suitable surface of the base 30. In addition, the mounting blocks 80 and guide rails 82 may be disposed between the connecting members 42 to limit the range of movement of the first cross member 70.

The first slide assembly 32 may be equipped with one or more locking mechanisms that inhibit movement. For example, the mounting blocks 80 may be equipped with a locking mechanism that inhibits movement along their respective guide rails.

The frame 72 may be disposed on the first cross member 70. In the embodiment shown, the frame 72 extends away from the base 30 and the seat bottom 22. The frame 72 may include a guide 84 and a seat contact member 86.

Figures 8, 9:
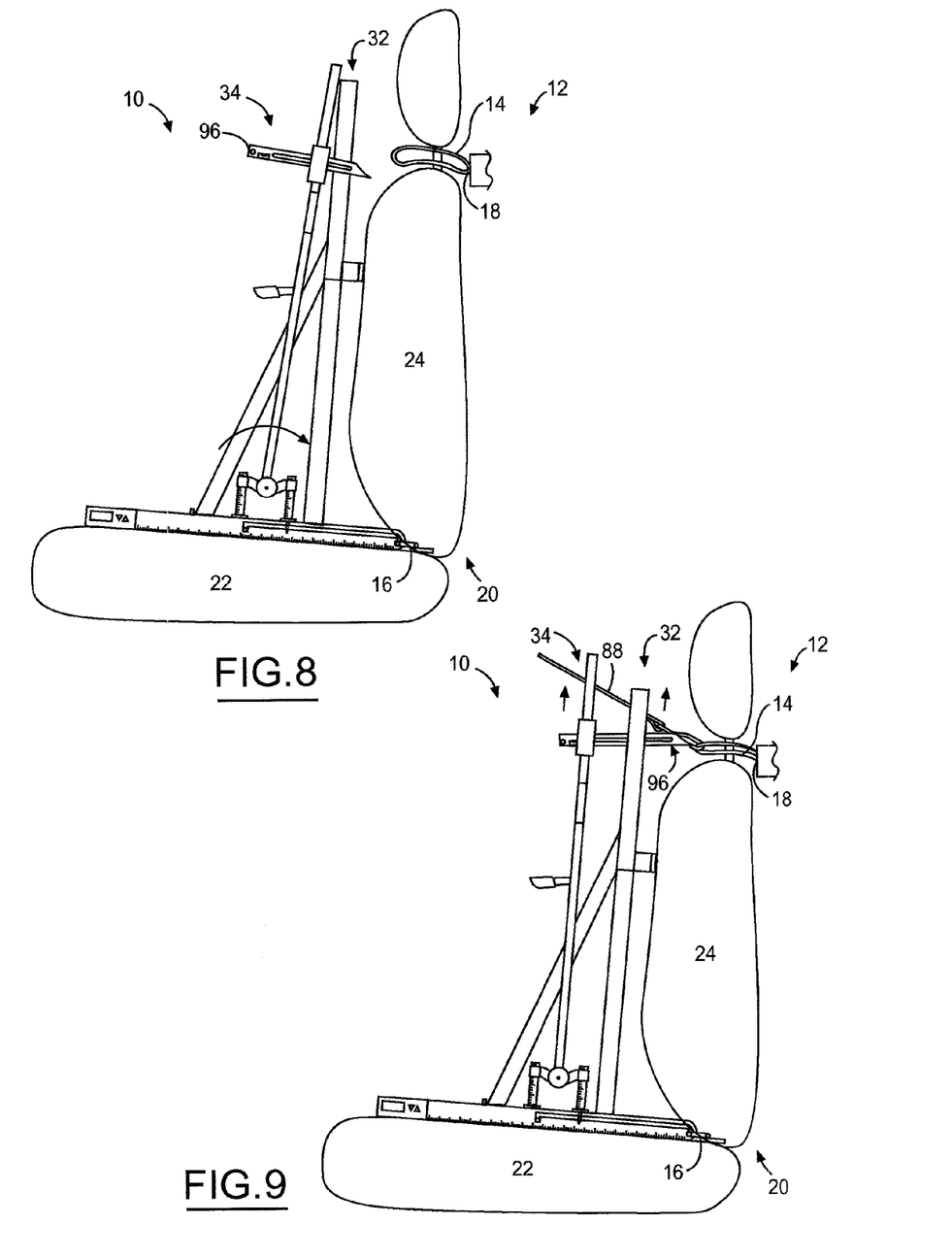

The guide 84 is adapted to receive and/or route a tether 88, shown in FIG. 9, that is adapted to engage the upper anchorage 14. The guide 84 may have any suitable configuration, such as an aperture, slot, or groove. In the embodiment shown, the guide 84 is configured as an aperture and is disposed near an end of the frame 72 located opposite the base 30.

The seat contact member 86 is adapted to contact and distribute force across the seat back 24. The seat contact member 86 may be disposed on the frame 72 above the base 30 and below the guide 84.

The second cross member 74 may be moveably disposed on the base 30 in any suitable manner. For example, each end of the second cross member 74 may be attached to a mounting block 80 that is moveably disposed on a guide rail 82 in a similar fashion as the first cross member 70.

The brace 76 may be used to support and stabilize the first cross member 70. In the embodiment shown, the brace 76 is attached to the frame 72 at a first end and attached to the second cross member 74 at a second end disposed opposite the first end.

The first slide assembly 32 may also include a block 90 for receiving a load force for biasing the first slide assembly 32 against the seat back 24. In the embodiment shown, the block 90 is disposed proximate the second cross member 74.

The second slide assembly 34 may include a positioning mechanism 92, a support 94, an arm 96, and a measurement tool 98. In the embodiment shown, the second slide assembly 34 includes a pair of positioning mechanisms 92 and a pair of supports 94.

The positioning mechanism 92 is adapted to help position the measurement tool 98 relative to the base 30. In the embodiment shown, the positioning mechanism 92 includes a first portion 100, a second portion 102, and a pivot portion 104. The first portion 100, second portion 102, and pivot portion 104 may be configured to move along a plurality of axes, such as first, second and third axes 106, 108, 110, respectively.

The first portion 100 may be moveably disposed on the base 30 and may have any suitable configuration. In the embodiment shown, the first portion 100 includes a first pair of beams 112 each disposed on a mounting block 114. Each mounting block 114 is adapted to be moveably positioned along a guide rail 116. Moreover, each mounting block 114 may be equipped with a locking mechanism that inhibits movement.

The second portion 102 is moveably disposed on the first portion 100. The second portion 102 may have any suitable configuration. In the embodiment shown, the second portion 102 is moveably disposed on the first pair of beams 112. In addition, the second portion 102 may include a locking mechanism that inhibits movement of the second portion 102.

The pivot portion 104 is disposed proximate the second portion 102 and is adapted to rotate about an axis of rotation. In addition, the pivot portion 104 may include a locking mechanism that inhibits rotation.

The positioning mechanism 92 may include a pointer 118 that extends toward the scale 64 to help indicate the position of the second slide assembly 34 and reduce parallax error.

The support 94 may be disposed proximate the pivot portion 104 in any suitable manner. In the embodiment shown, the support 94 is attached to the pivot portion 104 at a first end. The support 94 may have any suitable configuration. In the embodiment shown, the support 94 has a generally tubular shape. Optionally, the support may be configured as a telescopic rod that can be extended to any suitable length.

The arm 96 may be moveably coupled to the support 94. In the embodiment shown, the arm 96 is connected to the supports 94 with bearings that are adapted to slide along an outer surface of support 94. In addition, the support 94, arm 96, and/or bearings may be configured with one or more locking mechanisms that inhibit movement. The arm 96 may have any suitable configuration. In the embodiment shown, the arm 96 includes three generally parallel sections. Alternatively, the arm 96 may be configured with a single section.

The measurement tool 98 is adapted to measure a distance to the upper anchorage 14. In the embodiment shown, the measuring device 98 is configured as a scale. The measurement tool 98 may be moveably disposed on the arm 96 in any suitable manner. For example, the measurement tool 98 may include a slot that facilitates positioning relative to the arm 96 and inhibits the scale 64 from disengaging from the arm 96.

The second slide assembly 34 may also include an inclinometer 120 adapted to measure an angular position of the support 94.

Optionally, the second slide assembly 32 may include a handle 122 to assist with positioning. In the embodiment shown, the handle 122 extends between the supports 94.

Figure 3:
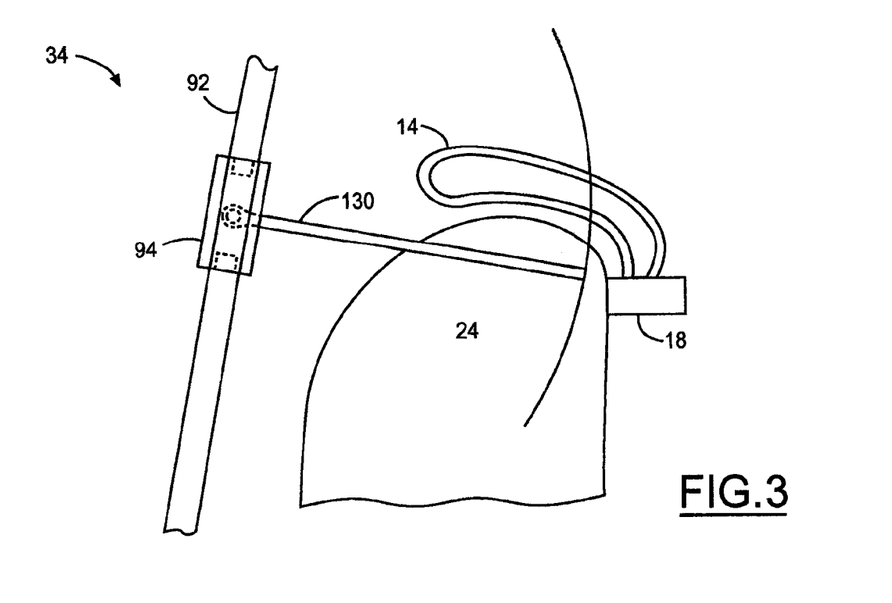
FIG. 3 is a fragmentary side view of a portion of the apparatus having a measurement tool for assessing the position of an anchorage.

Referring to FIGS. 1 and 3, the second slide assembly 32 may optionally include one or more measurement devices 130 for assessing the position of the upper anchorage 14. The measurement device 130 may be configured as a flexible member having a predetermined length. The measurement device 130 may be disposed on a portion of the second slide assembly 34, such as the arm 96. The measurement device 130 is configured to move in an arc (represented by the solid arcuate line) about its mounting point. The arc represents a boundary between acceptable and unacceptable locations for the upper anchorage 14. The arm 96 may be disposed at a predetermined location along the support 94 when the arc is established. In an embodiment having multiple measurement devices 130 having different lengths, the arm 96 may be positioned in different predetermined locations before each arc is established. For example, the arm 96 may be positioned at first and second predetermined points along the supports 94 representative of "R" and "V" points in Federal Motor Vehicle Safety Specification 225.

Figure 4:
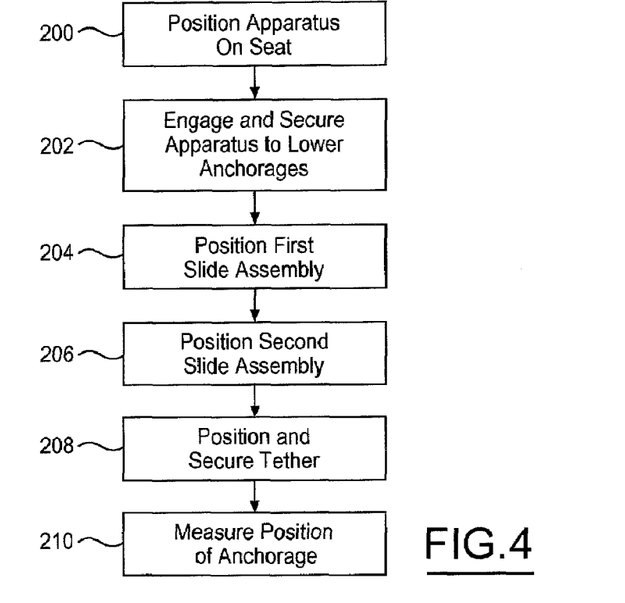
FIG. 4 is a flowchart of a method for assessing the position of an anchorage.
Figure 5:
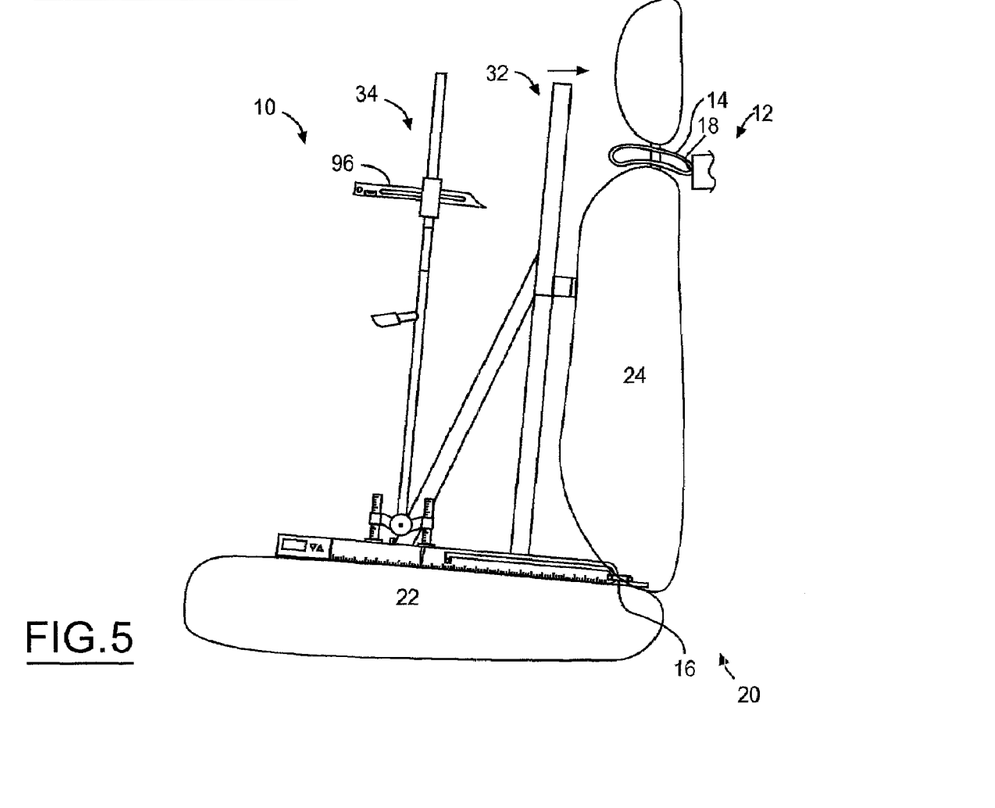
FIG. 5 is a side view of the apparatus depicting positioning of a first slide assembly.

Referring to FIG. 4, a method of assessing the position of an anchorage of the child restraint anchorage system is shown. The steps of the method are depicted in FIGS. 5-9 as indicated below.

At 200, the apparatus is positioned on the vehicle seat. More specifically, the apparatus is positioned such that the base is disposed proximate the seat bottom with the latch pins in the unlatched position to permit the lower anchorages, if provided, to be received in the engagement arm slots.

At 202, the latch pins are actuated from the unlatched position to the latched position to secure the apparatus to the lower anchorages. This step may be omitted if the child restraint anchorage system does not employ lower anchorages. Optionally, an adapter may be installed in the engagement arm slots in place of the lower anchorages. In such an embodiment, the positioning of the apparatus may be established relative to a predetermined point on the vehicle rather than to the lower anchorages.

At 204 (FIG. 5), the first slide assembly is positioned against the seat back. More specifically, the first slide assembly is unlocked and actuated from the retracted position toward the advanced position. A predetermined load force may be applied to actuate the first slide assembly. For example, a predetermined load of 35 lbf (approximately 156N) may be applied against the block 90 to move the frame against the seat back. One or more locking mechanisms of the first slide assembly may be engaged to hold the first slide assembly in position.

Figures 6, 7:
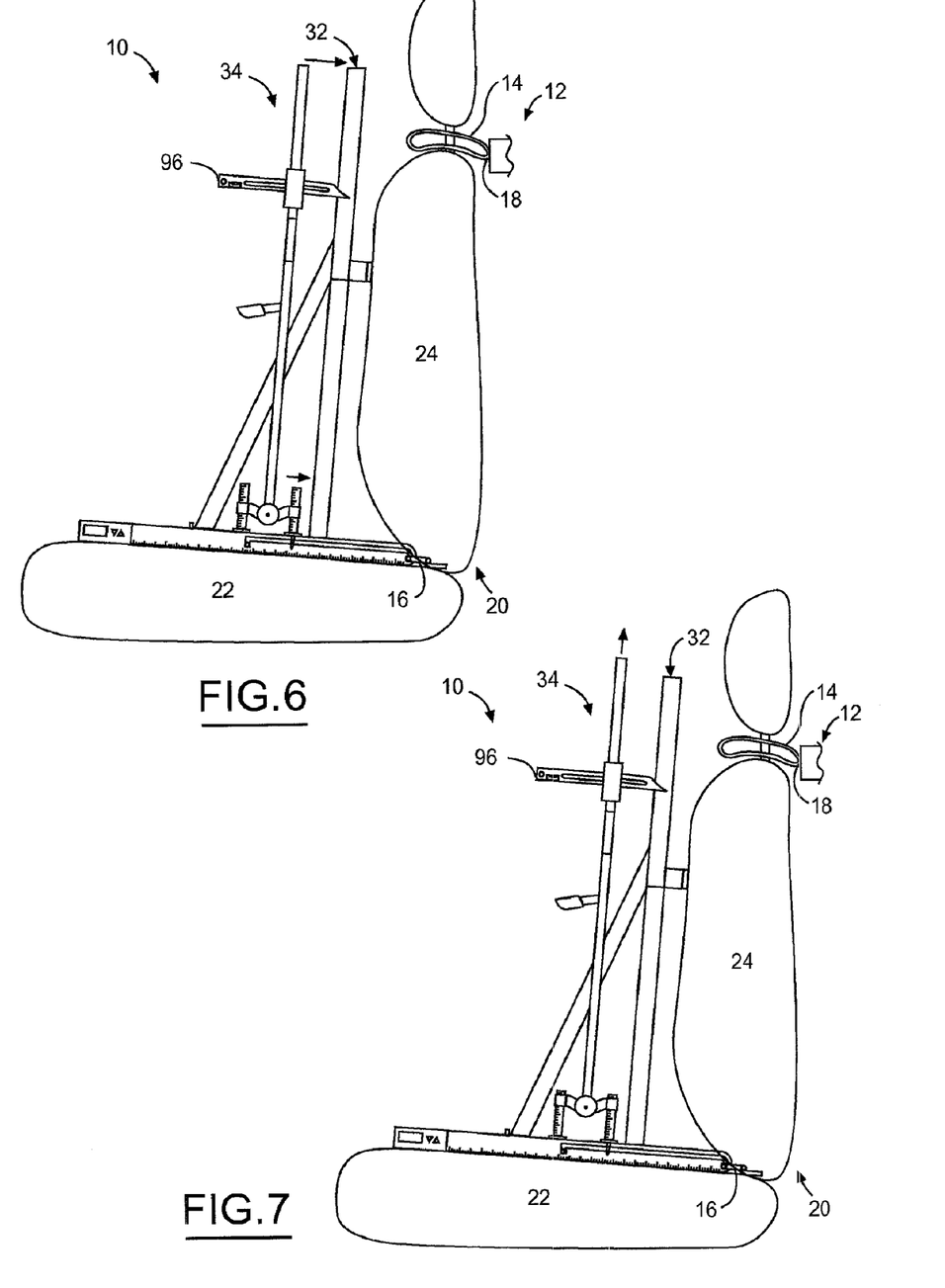
FIGS. 6-9 are side views of the apparatus depicting positioning of a second slide assembly.

At 206, the second slide assembly is positioned. More specifically, an angle of inclination of the base is measured by the inclinometer disposed proximate the base. This angle is used along with predetermined coordinates associated with a particular seat configuration to calculate a target location for the second slide assembly. For example, the target location may represent a desired position of the center of the pivot portion. Once the target location is determined, the first and second portions of the second slide assembly are moved as necessary. For example, the first portion may be slid along the base (FIG. 6) and the second portion may be moved along the first portion (FIG. 7). Locking mechanisms associated with the first and second portions may be engaged to inhibit movement.

Next, the pivot portion may be actuated to a predetermined angle (FIG. 6). The angle of the pivot portion may be measured using the inclinometer associated with the second slide assembly. Positioning may be facilitated using the handle to simultaneously position multiple supports at a predetermined angle without the need to set the position of each support individually. The pivot portion may be locked in position to inhibit movement once the predetermined angle is attained.

At 208 (FIG. 9), the tether is secured to the upper anchorage and routed through the guide of the first slide assembly. A predetermined load may be applied to the tether to extend or position the upper anchorage. The predetermined load may be any suitable value, such as 14 lbf (approximately 62 N).

Next, the position of the arm is adjusted such that the vertical height of the arm is approximately the same as the engaged end or forward point of the loaded upper anchorage. The arm is then locked in position. Alternatively, the arm may be positioned before the tether is secured and the predetermined load force is applied.

At 210, the position of the upper anchorage is measured. More specifically, the measurement tool of the second slide assembly is used to measure the horizontal distance between the end of the upper anchorage and the arm. As such, the measuring devices may be used to determine whether the anchorages are oriented within acceptable location tolerance limits.

While the best mode for carrying out the invention has been described in detail, those familiar with the art to which this invention relates will recognize various alternative designs and embodiments for practicing the invention as defined by the following claims.

What is claimed is:

1. An apparatus for assessing a position of an upper anchorage of a child restraint anchorage system disposed proximate a vehicle seat having a seat bottom and a seat back, the apparatus comprising:
   a base adapted to be positioned on the seat bottom;
   a first slide assembly that slides along the base for engaging the seat back, and
   a second slide assembly moveably disposed on the base and having a measurement tool for measuring the position of the upper anchorage.

2. The apparatus of claim 1 wherein the base further comprises an engagement arm having a slot adapted to receive a lower anchorage.

3. The apparatus of claim 2 wherein the engagement arm further comprises a latch pin disposed at least partially within the engagement arm and adapted to secure the engagement arm to the lower anchorage.

4. The apparatus of claim 1 wherein the first slide assembly is adapted to move between a retracted position in which the first slide assembly is spaced apart from the seat back and an advanced position in which the first slide assembly contacts the seat back.

5. The apparatus of claim 1 wherein the first slide assembly includes a frame having a guide for receiving a tether adapted to engage the upper anchorage.

6. The apparatus of claim 5 wherein the first slide assembly further comprises a first cross member moveably disposed on the base and the frame is disposed proximate the first cross member.

7. The apparatus of claim 6 wherein the first slide assembly further comprises a second cross member moveably disposed on the base and spaced apart from the first cross member and a brace attached to the frame at a first end and attached to the second cross member at a second end.

8. The apparatus of claim 1 wherein the measurement tool is a scale moveably disposed on the second slide assembly.

9. The apparatus of claim 1 wherein the second slide assembly further comprises a positioning mechanism adapted to move along a first axis disposed parallel to the base and along a second axis disposed perpendicular to the base, and adapted to pivot about an axis of rotation disposed perpendicular to the first and second axes.

10. The apparatus of claim 9 wherein the second slide assembly further comprises a support attached to and positionable by the positioning mechanism.

11. The apparatus of claim 10 wherein the second slide assembly further comprises an arm moveably disposed on the support and configured to receive the measurement tool.

12. The apparatus of claim 1 wherein the second slide assembly further comprises a second measurement tool for assessing the position of the upper anchorage.

13. An apparatus for assessing a position of an anchorage of a child restraint anchorage system associated with a vehicle seat, the child restraint anchorage system having upper and lower anchorages, the apparatus comprising:
- a base adapted to engage a lower anchorage;
- a first slide assembly moveably disposed on the base and having a guide configured to receive a tether that extends from the upper anchorage; and
- a second slide assembly moveably disposed on the base and having a measurement tool for measuring the position of the upper anchorage.

14. The apparatus of claim 13 wherein the vehicle seat further comprises a seat back and the first slide assembly is adapted to be disposed between the seat back and the second slide assembly.

15. The apparatus of claim 13 wherein the first slide assembly moves along plane defined by the base.

16. The apparatus of claim 13 further comprising first and second inclinometers for measuring inclination of the base and a portion of the second slide assembly, respectively.

17. The apparatus of claim 13 wherein the base further comprises an engagement arm having a slot adapted to receive the lower anchorage and a latch pin having a hook portion configured to secure the lower anchorage to the engagement arm.

18. The apparatus of claim 13 wherein the second slide assembly further comprises a positioning mechanism having a first portion moveably disposed on the base, a second portion moveably disposed on the first portion, and a pivot portion attached to the second portion and adapted to rotate about an axis of rotation.

19. The apparatus of claim 18 wherein the second slide assembly further comprises a support attached to the pivot portion and the measurement tool is connected to the support.

20. A method of assessing a position of an anchorage of a child restraint anchorage system with an assessment apparatus, the child restraint anchorage system being associated with a vehicle seat having a seat back and a seat bottom, and the assessment apparatus including a base, a first slide assembly, and a second slide assembly having a measurement tool, the method comprising:
- positioning the base on the vehicle seat such that the base contacts the seat bottom;
- actuating the first slide assembly to contact the seat back;
- positioning the second slide assembly relative to the base; and
- measuring a distance between the slide assembly and the anchorage with the measurement tool.

* * * * *